United States Patent
Lewin et al.

(10) Patent No.: US 6,608,834 B1
(45) Date of Patent: Aug. 19, 2003

(54) SYSTEM FOR ENCAPSULATING ETHERNET FRAMES OVER VERY HIGH SPEED DIGITAL SUBSCRIBER LINES

(75) Inventors: Amit Lewin, Tel Aviv (IL); Opher Yaron, Tel Aviv (IL); Alon Hurwitz, Ramat Gan (IL); Yuri Poddobny, Herzelia (IL)

(73) Assignee: 3 Com Corporation, Santa Clara, CA (US)

( * ) Notice: Subject to any disclaimer, the term of this patent is extended or adjusted under 35 U.S.C. 154(b) by 0 days.

(21) Appl. No.: 09/318,887

(22) Filed: May 26, 1999

(51) Int. Cl.⁷ .............................................. H04L 12/16
(52) U.S. Cl. .................... 370/395.53; 209/219
(58) Field of Search ............... 370/395.53; 375/240.24; 709/219

(56) References Cited

U.S. PATENT DOCUMENTS

| | | | |
|---|---|---|---|
| 5,410,343 A | 4/1995 | Coddington et al. ............ 348/7 |
| 5,778,189 A | 7/1998 | Kimura et al. .......... 395/200.66 |
| 5,784,683 A | 7/1998 | Sistanizadeh et al. ........ 370/487 |
| 5,790,548 A | 8/1998 | Sistanizadeh et al. ........ 370/401 |
| 5,812,786 A | 9/1998 | Seazholtz et al. ....... 395/200.63 |
| 5,905,781 A | 5/1999 | McHale et al. ........... 379/93.14 |
| 5,909,564 A | 6/1999 | Alexander et al. .......... 395/311 |
| 5,978,373 A | 11/1999 | Hoff et al. ................... 370/392 |
| 5,991,308 A | * 11/1999 | Fuhrmann et al. ........... 370/342 |
| 5,999,565 A | 12/1999 | Locklear, Jr. et al. ........ 375/222 |
| 6,055,297 A | * 4/2000 | Terry ......................... 379/1.01 |
| 6,084,881 A | 7/2000 | Fosmark et al. ............. 370/397 |
| 6,088,368 A | * 7/2000 | Rubinstain et al. .......... 370/206 |
| 6,101,182 A | * 8/2000 | Sistanizadeh et al. ........ 370/352 |
| 6,104,749 A | * 8/2000 | Lu et al. ..................... 370/230 |
| 6,157,635 A | 12/2000 | Wang et al. ................. 370/352 |
| 6,178,161 B1 | * 1/2001 | Terry ............................ 370/276 |
| 6,236,664 B1 | 5/2001 | Erreygers ..................... 370/492 |
| 6,286,049 B1 | 9/2001 | Rajakarunanayake et al. ... 709/227 |
| 6,339,613 B2 | * 1/2002 | Terry ........................... 370/201 |
| 6,351,487 B1 | 2/2002 | Lu et al. ...................... 375/225 |
| 6,363,128 B1 | * 3/2002 | Isaksson et al. ............. 370/480 |
| 6,374,288 B1 | 4/2002 | Bhagavath et al. .......... 709/203 |
| 6,404,861 B1 | 6/2002 | Cohen et al. ............. 379/93.01 |
| 6,424,657 B1 | 7/2002 | Voit et al. .................... 370/412 |

FOREIGN PATENT DOCUMENTS

EP  1206109 A1 * 5/2002 .......... H04M/11/06

OTHER PUBLICATIONS

MPC 860 PowerQUICC™ User's Manual, Chapter 24, Motorola Corp., Jul. 1998.

(List continued on next page.)

*Primary Examiner*—Hassan Kizou
*Assistant Examiner*—Dmitry Levitan
(74) *Attorney, Agent, or Firm*—Howard Zaretsky

(57) ABSTRACT

An apparatus for and method of encapsulating Ethernet frame data in Very high speed Digital Subscriber Line (VDSL) frames. The VDSL frames are transmitted over a point to point VDSL link where they are subsequently extracted and forwarded as standard Ethernet frames. The VDSL facility transport system comprises an Ethernet to VDSL Consumer Premises Equipment (CPE) coupled to a DSL Access Multiplexer (DSLAM) over a VDSL transport facility. The Ethernet to VDSL CPE functions to receive a 10BaseT Ethernet signal and encapsulate the Ethernet frame into a VDSL frame for transmission over the VDSL facility. The DSLAM is adapted to receive VDSL frames, extract Ethernet frames therefrom and output a standard Ethernet signal. Ethernet frames are encapsulated within VDSL frames and transmitted on the wire pair without regard to the state of the SOC signals thus overcoming the problems associated with syncing the transmission of the Ethernet data with the SOC signals. The present invention also provides a method of providing the receiving station an indication of the start of a VDSL frame. A preamble having certain desirable characteristics is used by the receiving station to identify the start of a VDSL frame. To further ensure that a detected start of frame is valid, the length field of the VDSL frame is examined for a legal length value.

30 Claims, 5 Drawing Sheets

OTHER PUBLICATIONS

Technical Report TR–003, Framing and Encapsulation Standards for ADSL: Packet Mode, Jun. 1997, 17 pages.

RFC 1662, PPP in HDLC–Like Framing, Jul. 1994, pp. 1–23.

Taylor, "Internetworking Handbook", 1998, McGraw Hill, Second Edition, p. 697.

Broadcom Product Brief, BCM5203 Overview, Broadcom Corporation, Irvine, CA (1998), 2 pages.

VDSL Draft Specification ANSI T1E1.4 Subcommittee, American National Standards Institute, Huntsville, Alabama, Jun. 1998, 4 pages.

* cited by examiner

SYSTEM FOR ENCAPSULATING ETHERNET FRAMES OVER VERY HIGH SPEED DIGITAL SUBSCRIBER LINES

FIELD OF THE INVENTION

The present invention relates generally to data communication systems and more particularly relates to a system for transporting Ethernet frames over Very high speed Digital Subscriber Lines (VDSL).

BACKGROUND OF THE INVENTION

There is a growing need among both individuals and enterprises for access to a commonly available, cost effective network that provides speedy, reliable services. There is high demand for a high-speed data network, one with enough bandwidth to enable complex two-way communications. Such an application is possible today if, for example, access is available to a university or a corporation with sufficient finances to build this type of network. But for the average home computer user or small business, access to high speed data networks is expensive or simply impossible. Telephone companies are therefore eager to deliver broadband services to meet this current explosion in demand.

One of the problems is that millions of personal computers have found their place in the home market. Today, PCs can be found in approximately 43% of all United States households and a full 50% of United States teenagers own computers. Virtually every PC sold today is equipped with a modem, enabling communication with the outside world via commercial data networks and the Internet. Currently, people use their PCs to send and receive e-mail, to access online services, to participate in electronic commerce and to browse the Internet. The popularity of the Internet is such that there are an estimated 50 million users around the globe. These figures indicate that in the past few years the personal computer has fueled a dramatic increase in data communications and the corresponding demands on the data networks that carry the traffic.

The Internet serves as a good example of the increased demands that have been placed on data networks. At first, Internet access consisted of text only data transfers. Recently, with the popularity of the World Wide Web (WWW) and the construction of numerous sites with high quality content, coupled with the development of Internet browsers such as Mosaic, Netscape Navigator and Microsoft Explorer, the use of graphics, audio, video and text has surged on the Internet. While graphics, audio and video make for a much more interesting way to view information as opposed to plain text, bandwidth consumption is significantly more. A simple background picture with accompanying text requires approximately 10 times the bandwidth needed by text alone. Real-time audio and streaming video typically need even more bandwidth. Because of the increased requirement for bandwidth, activities such as browsing home pages or downloading graphics, audio and video files can take a frustratingly long period of time. Considering that the multimedia rich World Wide Web accounts for more than one quarter of all Internet traffic, it is easy to see why the demand for bandwidth has outpaced the supply. In addition, the creative community is pushing the envelope by offering audio and full motion video on numerous sites to differentiate themselves from the millions of other sites competing for maximum user hits.

As use of the Internet and online services continues to spread, so does the use of more complex applications, such as interactive video games, telecommuting, business to business communications and videoconferencing. These complex applications place severe strains on data networks because of the intensive bandwidth required to deliver data-rich transmissions. For example, a telecommuter who requires computer aided design (CAD) related documents and files to be transported over the data network requires a high-bandwidth data pipeline because of the significant size of CAD files. Similarly, a business to business transaction in which large database files containing thousands of customer records are exchanged also consumes large amounts of bandwidth. The same is true for users seeking entertainment value from sites offering high quality video and audio. The lack of available bandwidth in today's data networks is the primary barrier preventing many applications from entering mainstream use. Just as processing power limited the effectiveness of early PCs, bandwidth constraints currently limit the capabilities of today's modem user.

Most computer modem users access data through the standard telephone network, known as plain old telephone service (POTS). Equipped with today's speediest modems, dial up modems on a POTS network can access data at a rate of 28.8, 33.6 or 56 kbps. Dial up modem transmission rates have increased significantly over the last few years, but POTS throughput is ultimately limited to 64 kbps]. While this rate may be acceptable for some limited applications like e-mail, it is a serious bottleneck for more complex transactions, such as telecommuting, videoconferencing or full-motion video viewing. To illustrate, full motion video compressed, using the Motion Picture Entertainment Group (MPEG)-2 standard requires a data stream of approximately 6 Mbps, or roughly 208 times the throughput of a 28.8 kbps modem. Thus, using today's dial up modems, it would take more than 17 days to capture two hours of video. As bandwidth demands continue to grow, providers search for better ways to offer high speed data access. Further complicating the problem is the need to deliver all these complex services at an affordable price.

Today's most popular data access method is POTS. But as discussed previously, POTS is limited when it comes to large data transfers. An alternative to POTS currently available is Integrated Services Digital Network (ISDN). In the past few years, ISDN has gained momentum as a high-speed option to POTS. ISDN expands data throughput to 64 or 128 kbps, both from the network to the home and from the home back to the network, and can be technically made available throughout much of the United States and in many other parts of the globe. Similar to POTS, ISDN is a dedicated service, meaning that the user has sole access to the line preventing other ISDN users from sharing the same bandwidth. ISDN is considered an affordable alternative, and in general, ISDN is a much better solution for applications such as Web browsing and basic telecommuting. However, like POTS, it severely limits applications such as fly telecommuting with CAD files and full-motion video viewing. The latter requires roughly 39 times the throughput than that provided by ISDN. Multichannel multipoint distribution service (MMDS), a terrestrial microwave wireless delivery system, and direct broadcast satellite (DBS), such as DirecTv and U.S. Satellite Broadcasting (USSB), are wireless networks. They both deliver high bandwidth data steams to the home, referred to as downstream data, but neither has a return channel through which data is sent back over the network, referred to as upstream data. Although it is a relatively affordable system to deploy for broadcast applications because it requires no cable wires to be laid, it falls short in interactive access. In order to use a wireless system for something as basic as e-mail, an alternate technology such as a telephone line must be used for the upstream communications.

Another network delivery system is asymmetric digital subscriber line (ADSL). Offering a downstream capacity of 6 Mbps or more to the home, ADSL has the downstream capacity to handle the most complex data transfers, such as full motion video, as well as an upstream capacity of at least 500 kbps. However, due to its limitation of downstream bandwidth capacity, it essentially is a single service platform. Also, since it has to overcome the challenge of reusing several thousand feet of twisted pair wiring, the electronics required at each end of the cable are complex, and therefore currently very expensive.

Hybrid fiber coax (HFC), a network solution offered by telephone and cable companies, is yet another option for delivering high bandwidth to consumers known in the art. However, HFC has limitations. HFC networks provide a downstream capacity of approximately 30 Mbps, which can be shared by up to 500 users. Upstream bandwidth is approximately 5 Mbps and is also shared. A disadvantage with HFC is that shared bandwidth and limited upstream capacity become serious bottlenecks when hundreds of users are sending and receiving data on the network, with service increasingly impaired as each user tries to access the network.

It is a current trend among telephone companies around the world to include existing twisted pair copper loops in their next generation broadband access networks. Hybrid Fiber Coax (HFC), a shared access medium well suited to analog and digital broadcast, comes up short when utilized to carry voice telephony, interactive video and high speed data communications at the same time.

Fiber to the home (FTTH) is still prohibitively expensive in the marketplace that is soon to be driven by competition rather than costs. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). VDSL is an emerging standard that is currently undergoing discussion in ANSI and ETSI committees. The system transmits high-speed data over short reaches of twisted pair copper telephone lines, with a range of speeds depending upon actual line length.

The VDSL standard as provided by the VDSL Draft Specification being drafted by the ANSI T1E1.4 Technical Subcommittee, provides guidelines for the transmitter and receiver within the VDSL modem. The connection between the VDSL modem and the CPE specifies a number of signals including TxData, RxData, RxErr, TxCLK, RxCLK and TxSOC and RxSOC. The latter two signals, i.e., TxSOC and RxSOC, provide an indication of the start of the VDSL frame to the CPE for both transmission and reception.

It is intended that the SOC signal be used by the CPE to synchronize the transmission and reception of the data to and from VDSL modem. In the case of transporting Ethernet data over the VDSL facility, a problem arises, however, when attempting to sync Ethernet frames to VDSL frames. The problem with using these SOC signals is that the VDSL frame is a fixed number of bytes, e.g., 256 bytes, whereas the Ethernet frame may vary from 64 to 1518 bytes. Designing and implementing the circuitry, e.g., state machines, timing and framing circuits, etc., to perform the protocol matching, i.e., sync timing between Ethernet frames and VDSL frames is very complicated and hence expensive to implement.

It is desirable to have a means of transporting Ethernet frame data over a VDSL transport facility that does not require the complicated circuitry and state machines when utilizing the SOC signals provided by the VDSL modem.

SUMMARY OF THE INVENTION

The present invention is an apparatus for and method of encapsulating Ethernet frame data in Very high speed Digital Subscriber Line (VDSL) frames. The VDSL frames are transmitted over a point to point VDSL link where they are subsequently extracted and forwarded as standard Ethernet frames.

A typical VDSL facility transport system comprises an Ethernet to VDSL Consumer Premises Equipment (CPE) coupled to a DSL Access Multiplexor (DSLAM) over a VDSL transport facility. The DSLAM is typically located at the curb or before the 'last mile' in a subscriber loop. The Ethernet to VDSL CPE functions to receive a 10BaseT Ethernet signal and encapsulate the Ethernet frame into a VDSL frame for transmission over the VDSL facility. Likewise, the Ethernet to VDSL CPE also functions to receive a VDSL signal, extract Ethernet frames therefrom and output them as standard 10BaseT Ethernet signals.

The DSLAM is adapted to receive VDSL frames, extract Ethernet frames therefrom and generate and output a standard Ethernet signal. Likewise, the DSLAM is also adapted to receive standard Ethernet frames from an Ethernet input signal and encapsulate them in VDSL frames for transmission over the VDSL facility.

In accordance with the invention, the SOC signals provided by the VDSL are not utilized in transmitting the Ethernet frame data over the VDSL facility. Ethernet frames are encapsulated within VDSL frames and transmitted on the wire pair without regard to the state of the SOC signals. This overcomes the problems associated with syncing the transmission of the Ethernet data with the SOC signals.

The present invention also provides a method of providing the receiving station an indication of the start of a VDSL frame. A preamble having certain desirable characteristics such as good autocorrelation properties is used by the receiving station to identify the start of a VDSL frame. To further ensure that a detected start of frame is valid, the length field of the VDSL frame is examined.

The receiving station performs a check to determine whether the preamble pattern detected is actually a preamble or is Ethernet data within the payload of the VDSL frame. The length field contains 16 bits allowing for 65,536 combinations but only 1518−64=1454 of them are valid since the payload of the VDSL frame carries only Ethernet frame data which can only range from 64 to 1518 bytes. Thus, the length field is checked to further narrow the chance of a wrong synchronization.

There is provided in accordance with the present invention a method of transporting Ethernet frames over a Very high speed Digital Subscriber Line (VDSL) transport facility coupling a first communication device and a second communication device, the method comprising the steps of receiving an input Ethernet frame data on the first communication device from a first Ethernet compatible communication device coupled thereto, encapsulating the received Ethernet frame within a VDSL frame, inserting a preamble and length field in the VDSL frame, transmitting the VDSL frame over the VDSL transport facility, receiving VDSL frame data on the second communication device, extracting the Ethernet frame from the received VDSL frame and generating an output Ethernet frame therefrom and transmitting the output Ethernet frame to a second Ethernet compatible communication device coupled to the second communication device.

The step of encapsulating comprises the step of stripping off the preamble and start of frame fields from the Ethernet frame before placing the Ethernet frame in the VDSL frame. The length field inserted in the VDSL frame represents the length of the Ethernet frame without the Ethernet preamble and Ethernet start of frame fields. The step of generating comprises the step of adding Ethernet preamble and Ethernet start of frame fields to the extracted Ethernet frame.

There is also provided in accordance with the present invention a method of transporting Ethernet frames over a Very high speed Digital Subscriber Line (VDSL) transport facility connecting a first communication device and a second communication device, the method comprising the steps of receiving an input Ethernet frame data on the first communication device from a first Ethernet compatible communication device coupled thereto, generating a multi-byte preamble field for use by the second communication device to identify the start of a VDSL frame, generating a length field representing the length of the Ethernet frame to be transmitted over the VDSL transport facility, generating a data field comprising the Ethernet frame to be transmitted over the VDSL transport facility, assembling the preamble field, length field and the data field so as to generate a VDSL frame, transmitting the VDSL frame over the VDSL transport facility, receiving VDSL frame data on the second communication device, extracting the Ethernet frame from the data field and generating an output Ethernet frame therefrom and transmitting the output Ethernet frame to a second Ethernet compatible communication device coupled to the second communication device.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ADSL | Asymmetric Digital Subscriber Line |
| ANSI | American National Standards Institute |
| CAD | Computer Aided Design |
| CAP | Carrierless Amplitude Modulation/Phase Modulation |
| CPE | Consumer Premises Equipment |
| CRC | Cyclic Redundancy Check |
| DBS | Direct Broadcast Satellite |
| DC | Direct Current |
| DSL | Digital Subscriber Loop |
| DSLAM | DSL Access Multiplexor |
| ETSI | European Telecommunications Standards Institute |
| FCS | Frame Check Sequence |
| FDM | Frequency Division Multiplexing |
| FEXT | Far End Crosstalk |
| FTTB | Fiber to the Building |
| FTTC | Fiber to the Curb |
| FTTCab | Fiber to the Cabinet |
| FTTEx | Fiber to the Exchange |
| FTTH | Fiber to the Home |
| FTTN | Fiber to the Node |
| HFC | Hybrid Fiber Coax |
| IFG | Interframe Gap |
| ISDN | Integrated Services Digital Network |
| MMDS | Multichannel Multipoint Distribution Service |
| MPEG | Motion Picture Entertainment Group |
| NEXT | Near End Crosstalk |
| PC | Personal Computer |
| POTS | Plain Old Telephone Service |
| QAM | Quadrature Amplitude Modulation |
| QoS | Quality of Service |
| RF | Radio Frequency |
| RFI | Radio Frequency Interference |
| SNMP | Simple Network Management Protocol |
| SOC | Start of Cell |
| SOF | Start of Frame |
| USSB | US Satellite Broadcasting |
| UTP | Unshielded Twisted Pair |
| VDSL | Very High Speed Digital Subscriber Line |
| WWW | World Wide Web |

General Description

The present invention is an apparatus for and method of encapsulating Ethernet frame data in Very high speed Digital Subscriber Line (VDSL) frames. The VDSL frames are transmitted over a point to point VDSL link where they are subsequently extracted and forwarded as standard Ethernet frames. As used throughout this document, the term VDSL frame is intended to denote a frame of data having a variable length that is transmitted over the VDSL transport facility. The length of the VDSL frame varies in accordance with the length of the Ethernet frame encapsulated within. The VDSL frame of the present invention bears no relationship and should not be confused with the VDSL frame having a fixed length of 405 bytes as described in the VDSL Draft Specification published by the ANSI T1E1.4 Subcommittee.

Figure 1:
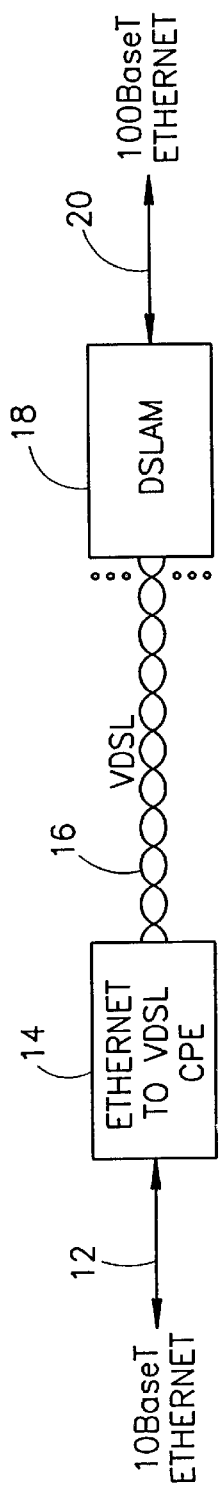
FIG. 1 is a block diagram illustrating an Ethernet to VDSL CPE coupled to a DSLAM over a VDSL transport facility.

A block diagram illustrating an Ethernet over VDSL transport facility is shown in FIG. 1. The system, generally referenced 10, comprises an Ethernet to VDSL Consumer Premises Equipment (CPE) 14 coupled to a DSL Access Multiplexor (DSLAM) 18 over a VDSL transport facility 16. The Ethernet to VDSL CPE 14 functions to receive a 10BaseT Ethernet signal 12 and encapsulate the Ethernet frame into a VDSL frame for transmission over the VDSL facility 16. Likewise, the Ethernet to VDSL CPE 14 also functions to receive a VDSL signal and extract Ethernet frames therefrom for output as standard 10BaseT Ethernet signals 12.

The DSLAM 18 is adapted to receive VDSL frames, extract Ethernet frames therefrom and generate and output a standard Ethernet signal. Likewise, the DSLAM 18 is also adapted to receive standard Ethernet frames from an Ethernet input signal 20 and encapsulate them in VDSL frames for transmission over the VDSL facility 16.

The VDSL facility 16 may comprise any suitable transport facility that is capable of transporting 10BaseT Ethernet data from one point to another. Preferably the VDSL facility conforms to the VDSL standard which is currently a draft specification being formulated by the ANSI T1E1.4 Technical Subcommittee.

A transport facility suitable for use with the present invention is the 10BaseS transport facility described in detail in U.S. Pat. No. 6,088,368, entitled 'Ethernet Transport Facility Over Digital Subscriber Lines,' incorporated herein by reference. A brief description of this transmission system is given below.

The 10BaseS transport facility is capable of transmitting 10 Mbps Ethernet over existing copper infrastructure. The system utilizes carrierless amplitude and phase modulation (CAP) which is a version of suppressed carrier quadrature amplitude modulation (QAM). QAM is the most commonly used form of high speed modulation over voice telephone lines. The system also utilizes frequency division multiplexing (FDM) to separate downstream channels from upstream channels. In addition, FDM is also used to separate both the downstream and the upstream channels from POTS and ISDN signals. A substantial distance in frequency is maintained between the lowest data channel and POTS frequencies to permit the use of very simple and cost effective POTS splitters, which are actually splitters/combiners. The upstream channel is placed above the downstream channel in frequency. The downstream and upstream data channels are separated in frequency from bands used for POTS and ISDN, enabling service providers to overlay 10BaseS on existing services.

The 10BaseS system combines copper access transmission technology of Ethernet based services with Quality of Service (QoS) guaranteed by the SRVP protocol and is capable of being fully managed through an SNMP agent. The 10BaseS transport facility can deliver symmetrical data at 12.96 Mbps (net 10 Mbps) over unshielded twisted pair (UTP) telephone wires originally intended for bandwidths of between 300 Hz and 3.4 kHz. QAM modulation and blind equalization are used to achieve a high transmission speed over existing copper infrastructure. In addition, the system is able to cope with several sources of noise such as impulse noise, e.g., POTS transients, radio frequency interference (RFI) noise and crosstalk noise, i.e., both near end crosstalk (NEXT) and far end crosstalk (FEXT). In terms of RF emissions, the system can operate using underground cabling as well as overhead distribution cabling.

Figure 2:
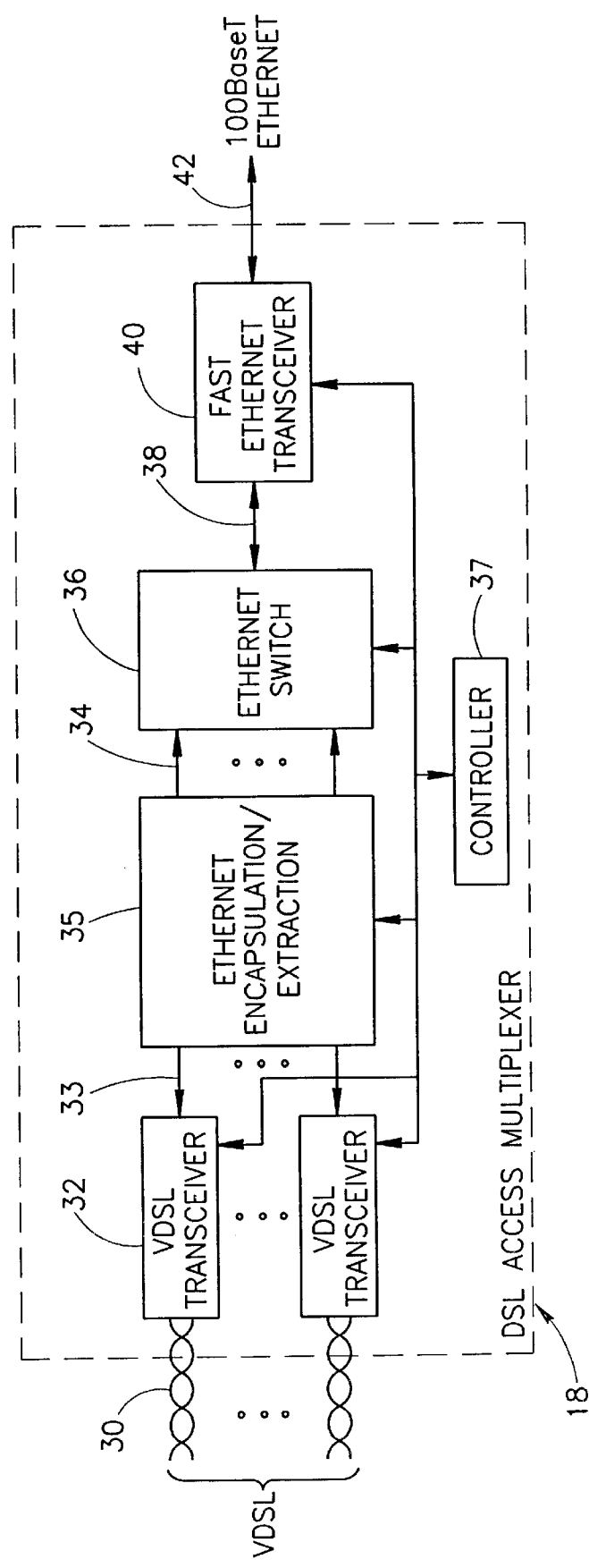
FIG. 2 is a block diagram illustrating the DSL Access Multiplexor (DSLAM) in more detail.

The DSLAM 18 will now be described in more detail. A block diagram illustrating the DSL Access Multiplexor (DSLAM) in more detail is shown in FIG. 2. As described previously, the DSLAM 18 functions to encapsulate and extract Ethernet frames into and from VDSL frames. The DSLAM typically is adapted to generate a plurality of VDSL streams to be transmitted over a plurality of VDSL facilities 30 via one or more VDSL transceivers 32 at the front end. The DSLAM comprises a high speed Ethernet port at the back end, an Ethernet switch 36, Ethernet encapsulation/extraction circuitry 35 and a plurality of VDSL transceivers 32. The transceiver 40 functions to receive, for example, a 100BaseT Fast Ethernet signal 42 and provide bidirectional Fast Ethernet communications.

In the Ethernet to VDSL direction, Ethernet frames are received over the 100BaseT Fast Ethernet port 42 and are input to the Fast Ethernet transceiver 40. The Fast Ethernet signals are input to an Ethernet switch 36 capable of switching at Fast Ethernet speeds. The GT48212 Switched Ethernet Controller manufactured by Galileo Technology, San Jose, Calif. can be used to construct the Ethernet switch of the present invention. The switch 36 is coupled via signal lines 34 to circuitry 35 that performs Ethernet encapsulation and extraction. The Ethernet encapsulation/extraction circuitry 35 functions to encapsulate the Ethernet frame data from each of the channels output of the witch 36 into VDSL frames and forward them via signal lines 33 to the VDSL transceiver 32 corresponding to that particular channel. The VDSL transceivers 32 modulate the VDSL frame data and generate a VDSL signal suitable for transmission over the twisted wire pairs 30. Note that the VDSL frames may be transmitted using the 10BaseS transport facility described above.

In the VDSL to Ethernet direction, VDSL signals, e.g., 10BaseS signals, are received by one or more VDSL transceivers 32 over the twisted pair wires 30. A VDSL modem suitable for use in constructing the VDSL transceivers 32 of the present invention comprises the BCM6010 VDSL Transceiver manufactured by Broadcom, Irvine, Calif. or VDSL transceivers manufactured by Savan Communications Ltd., Netanya, Israel.

Each VDSL transceiver 32 functions to demodulate the signal received over the twisted pair wires 30 and output VDSL frames via signal lines 33 to Ethernet encapsulation/extraction circuitry 35. The Ethernet encapsulation/extraction circuitry 35 functions to extract the Ethernet frame data encapsulated within the VDSL frame and generate standard Ethernet frames, which are then input via signal lines 34 to the Ethernet, switch 36. The switch forwards the Ethernet frames to the transceiver 40 for transmission over the 100BaseT port 42.

Figure 3:
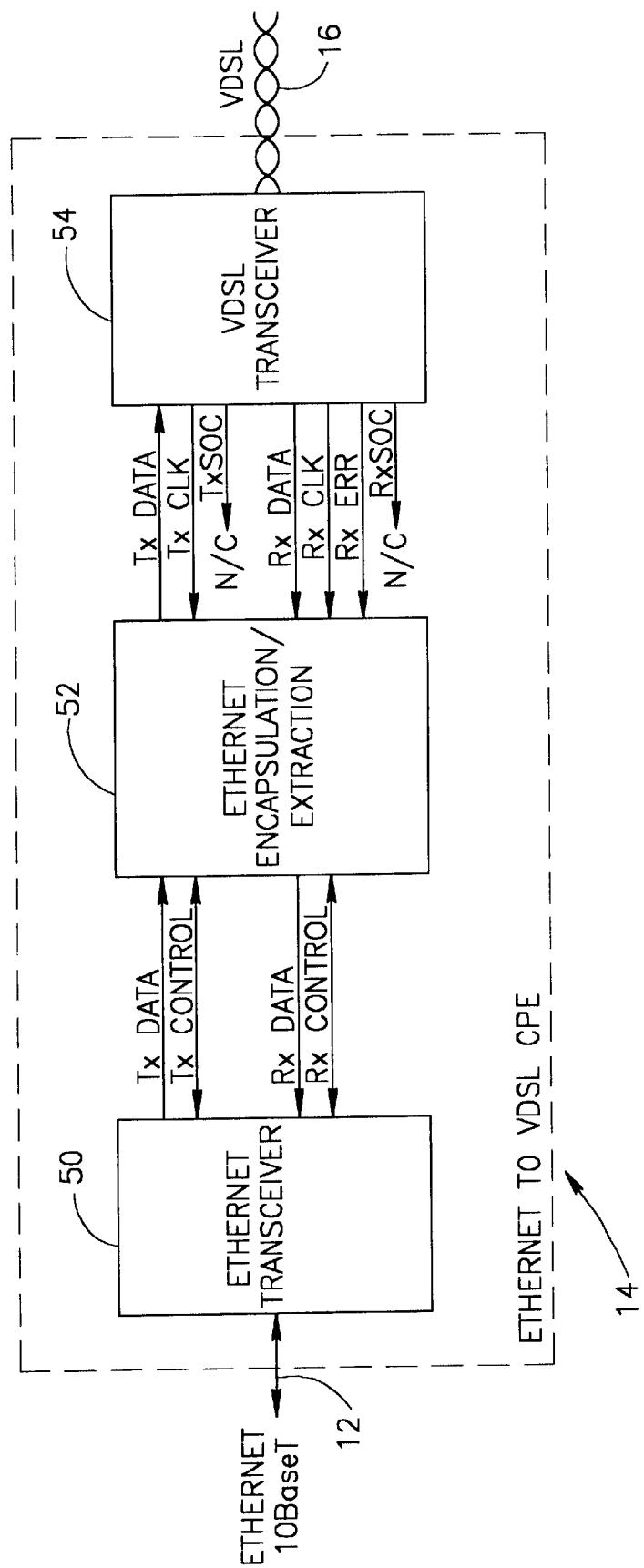
FIG. 3 is a block diagram illustrating the Ethernet to VDSL CPE in more detail.

The Ethernet to VDSL CPE unit will now be described in more detail. A block diagram illustrating the Ethernet to VDSL CPE in more detail is shown in FIG. 3. The Ethernet to VDSL CPE unit 14 comprises an Ethernet transceiver 50, Ethernet encapsulation/extraction circuitry 52 and VDSL transceiver 54. The Ethernet transceiver 50 is adapted to receive and transmit standard 10BaseT Ethernet signals 12. An Ethernet transceiver suitable for use with the present invention comprises the LXT905 10BaseT Ethernet transceiver manufactured by Level One Communications, Inc., Sacramento, Calif.

The transceiver 50 communicates with the encapsulation/extraction circuitry 52 via signal lines that comprise Tx and Rx data lines and a plurality of Tx and Rx control lines. The Ethernet encapsulation/extraction circuitry 52 performs protocol conversion between Ethernet and VDSL frame formats. A VDSL modem suitable for use in constructing the VDSL transceiver 54 of the present invention comprises the BCM6010 VDSL Transceiver manufactured by Broadcom, Irvine, Calif. or VDSL modems manufactured by Savan Communications Ltd., Netanya, Israel.

In the Ethernet to VDSL direction, Ethernet frames are received over the 10BaseT Ethernet port 12 and are input to the Ethernet transceiver 50. The Ethernet signals are input, via Tx and Rx data and control lines, to the Ethernet encapsulation/extraction circuitry 52 which functions to encapsulate the Ethernet frame data received over the Ethernet port 12 into VDSL frames. The VDSL frames are then forwarded to the VDSL transceiver 54. The VDSL transceiver 54 functions to modulate the VDSL frame data and generate a VDSL signal suitable for transmission over the twisted wire pair 16. Note that the VDSL frames may be transmitted using the 10BaseS transport facility described above.

In the VDSL to Ethernet direction, VDSL signals, which may comprise 10BaseS signals, are received by the VDSL transceiver 54 over the twisted pair wire 16. The VDSL transceiver 54 functions to demodulate the signal received over the twisted pair wire 16 and output VDSL frames to the Ethernet encapsulation/extraction circuitry 52. The Ethernet encapsulation/extraction circuitry 52 functions to extract the Ethernet frame data encapsulated within the VDSL frame and generate standard Ethernet frames which are then forwarded to the Ethernet transceiver 50 for transmission over the 10BaseT port 12.

The VDSL transceiver 54 functions to provide the clocking via TxCLK and RxCLK signals for both transmit and receive data signals TxData, RxData. In addition, the transceiver 54 provides a RxErr signal that is asserted when an error is detected in the received data. An error condition may comprise a framing error, loss of synchronization of the receive signal, etc. Further, the transceiver 54 provides a Tx and Rx Start of Cell (SOC) signal, TxSOC, RxSOC. The SOC signals, as defined in the VDSL draft standard, are suitable for use in transporting ATM cell data over VDSL but are suitable also for general use in synchronizing the TxData signal input to the transceiver and the RxData output of the transceiver. The Tx and Rx SOC signals provide a pulse at the beginning of the VDSL frame. A VDSL frame comprises a fixed number of bytes, e.g., 256, which has no relation to the number of bytes in an Ethernet frame.

As discussed previously in the Background of the Invention section of this document, the circuitry required to synchronize Ethernet frames to the VDSL frames in accordance with the SOC signals is very complex to design. The present invention overcomes this problem by sending and receiving Ethernet frame data over VDSL asynchronously with respect to the Transmit or Receive SOC signals. The invention functions to transmit the Ethernet frame data over the VDSL channel without utilizing the Transmit or Receive SOC signals. This eliminates any problems associated with synchronizing the Ethernet data to the SOC data. Problems include, for example, breaking up the Ethernet frame data into multiple sections to fit within the smaller VDSL frames (when the Ethernet frame exceeds 256 bytes) and subsequently regenerating the Ethernet frame by assembling the multiple smaller sections.

Figure 4:
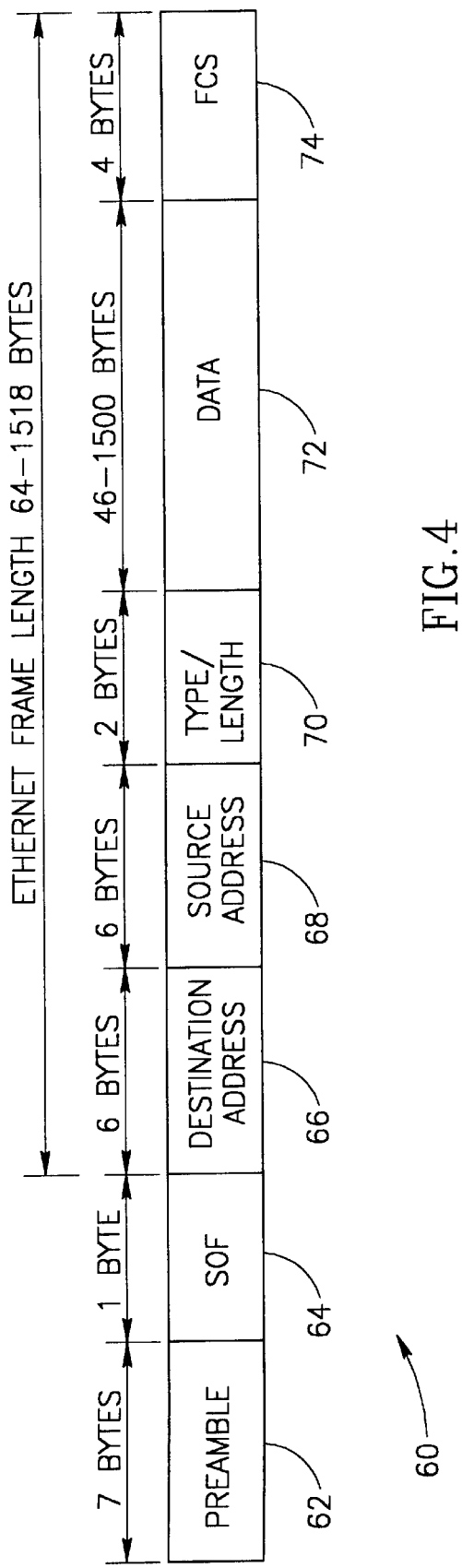
FIG. 4 is a diagram illustrating the format of a standard Ethernet frame.

A diagram illustrating the format of a standard Ethernet frame is shown in FIG. 4. A standard Ethernet frame, generally referenced 60, comprises a plurality of fields. The fields include a 7 byte preamble 62 consisting of 0xAA characters, a one byte Start of Frame (SOF) character 64 consisting of 0xAB, a 6 byte destination address 66, a 6 byte source address 68, 2 byte type/length 70, 46 to 1500 byte data field 72 and a 4 byte Frame Check Sequence 74 that comprises a CRC check. The type/length field 70 may comprise either type or length data, depending on the variant of Ethernet used. The fields comprising the destination address 66, source address 68, type/length 70, data 72 and FCS 74 are commonly referred to as the Ethernet frame. Note that the Ethernet frame may comprise from 64 to 1518 bytes depending on the size of the data field. Data shorter than 46 bytes is padded to a minimum of 46 bytes.

In accordance with the 802.3 standard, Ethernet data is transmitted using Manchester coding whereby an idle character is transmitting using DC and a '0' and '1' characters are transmitted having a transition halfway through the symbol, the transition for a '0' being opposite that for '1'.

Figure 5:
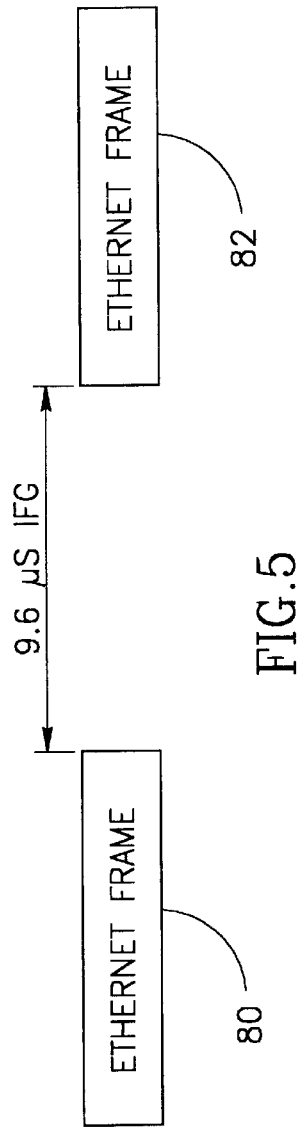
FIG. 5 is a diagram illustrating the interframe gap between two Ethernet frames.

A diagram illustrating the interframe gap (IFG) between two Ethernet frames is shown in FIG. 5. The Ethernet IEEE 802.3 standard provides for a minimum interframe gap of 9.6 $\mu$s between frames to facilitate collision detection and avoidance. The 9.6 $\mu$s IFG is equivalent to 12 bytes for 10 Mbps Ethernet. An example is shown whereby two Ethernet frames 80, 82 are separated by an IFG of 9.6 $\mu$s. The IFG is removed by the CPE 14 and is not transmitted over the VDSL facility. The IFG is inserted, however, when transmitting Ethernet frames constructed from VDSL frame data received over the VDSL facility.

Figure 6:
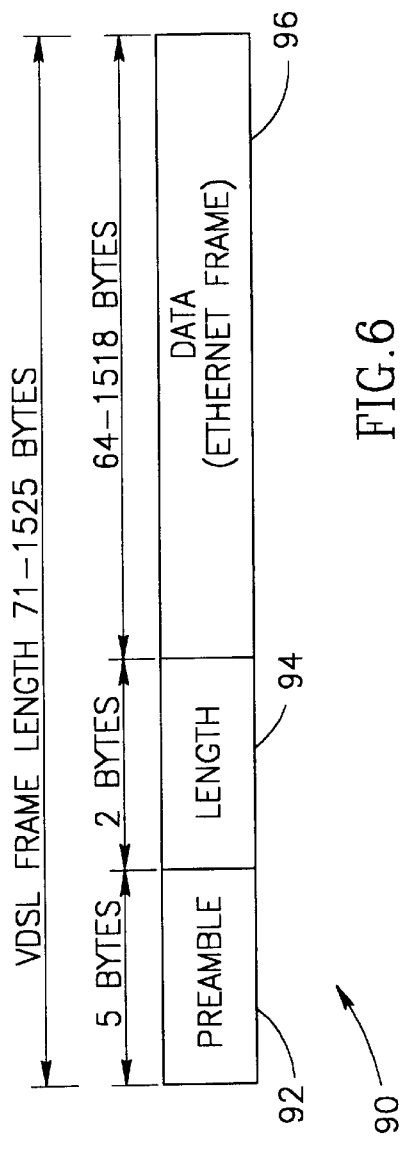
FIG. 6 is a diagram illustrating the format of VDSL frames that are transmitted over the VDSL facility.

A diagram illustrating the format of VDSL frames that are transmitted over the VDSL facility (or 10BaseS facility) is shown in FIG. 6. The VDSL frame, generally referenced 90, comprises a 5 byte preamble field 92, a 2 byte length field 94 and a data field 96. The preamble 92 comprises any suitable bit pattern that facilitates reception, detection and synchronization of the VDSL signal at the receiver. Preferably, the preamble is chosen to have optimal autocorrelation properties. The preamble field is used by the receiving station to identify a start of VDSL frame. Note that this field should not be confused with the 7 byte preamble field 62 (FIG. 4) of the Ethernet frame itself consisting of 0xAA characters.

The length field 94 conveys to the receiving station the number of bytes in the data field that follows. The data field comprises the encapsulated Ethernet frame that may have a length of 64 to 1518 bytes (excluding the preamble and SOF fields). The entire VDSL frame 90 can have a length, including the preamble and length fields, ranging from 71 to 1525 bytes. Note that if the IEEE 802.1Q standard is to be supported, the frame may be 4 bytes longer.

It is important to note that in accordance with the present invention, as described previously, the VDSL frame is transmitted without the use of the Tx or Rx SOC signals provided by the VDSL transceiver. In place of the SOC signals, the preamble performs the role of providing a means for the receiver in the VDSL transceiver to know when a VDSL frame begins. The length field allows the receiver to know when the VDSL frame ends.

Figure 7:
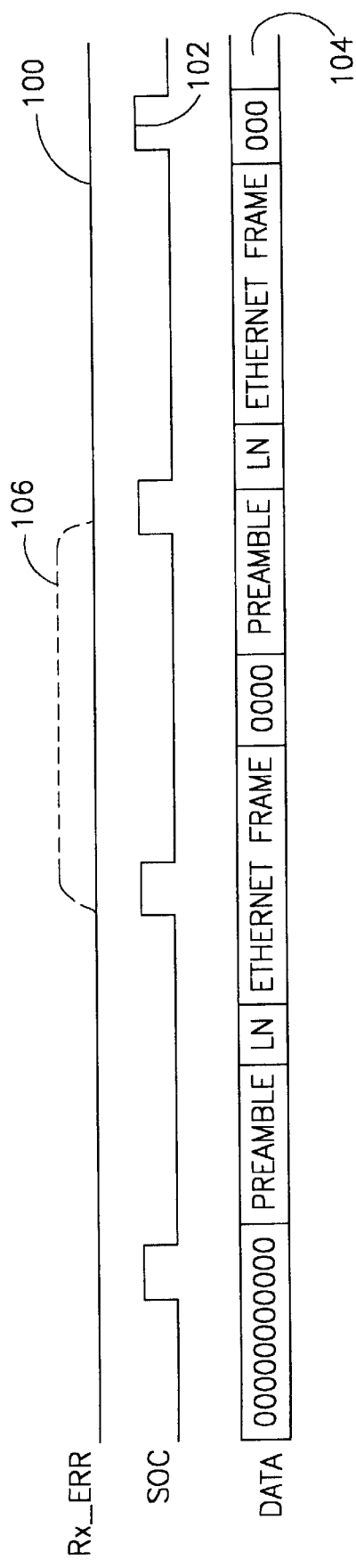
FIG. 7 is a timing diagram illustrating the relationship between the Rx_Err, SOC and VDSL data signals.

A timing diagram illustrating the relationship between the RxErr, SOC and VDSL data signals is shown in FIG. 7. As described previously, the RxErr signal (trace 100) is generated by the VDSL transceiver when sync is lost or any other error occurs in the receiver. The SOC signal (trace 102) is shown comprising a pulse to signal the start of the VDSL frame within the transceiver. The SOC signal, however, is not used by the apparatus of the invention. The data (trace 104) shown comprises a sequence of VDSL frames each consisting of a preamble, length and data fields with zeros inserted during idle times. As shown, the transmission of the data is completely independent from the SOC signal 102. As an example, a sync occurs as indicated by the dotted portion 106 of the Rx_Err trace 100. The data received during this time may contain one or more errors.

As described above, the Ethernet frame data boundaries received from the 10BaseT port 12 (FIG. 1) have no correlation with the VDSL frames transmitted over the VDSL facility 16. The Rx_Err indication at the receiving station, however, does relate to the VDSL data frames. If a VDSL frame is encountered that has errors, i.e., the Rx_Err signal is asserted, the frame can either be forwarded or dropped in accordance with an Rx_Err policy, which may be set by the user. If the policy is to drop frames, and the frame received contained non-idle Ethernet frame data, data will be lost. Note that theoretically, up to four Ethernet frames may reside within a single VDSL frame width, assuming 64 byte minimum size Ethernet frames and 256 byte VDSL frames (as specified by the VDSL Draft Standard).

In order to regain synchronization, the receiving station starts looking for the 5 byte pattern of the predefined preamble code. Note, however, that the Ethernet frame data encapsulated within the payload of the VDSL frame may contain the exact bit sequence of the preamble code pattern. This would result in the receiver regaining the wrong synchronization. The probability of this happening is given by Equation 1 below.

$$Pr(preamble\ error) = \left(\frac{1}{2}\right)^{40} \quad (1)$$

$$\approx 10^{-12}$$

In accordance with the present invention, the receiving station performs a check to determine whether the preamble pattern detected is actually a preamble or is Ethernet data within the payload of the VDSL frame. The length field contains 16 bits allowing for 65,536 combinations but only 1518−64=1454 of them are valid. Thus, the length field can be checked to further narrow the chance of a wrong sync. A flow diagram illustrating the receiver sync method is presented below.

Figure 8:
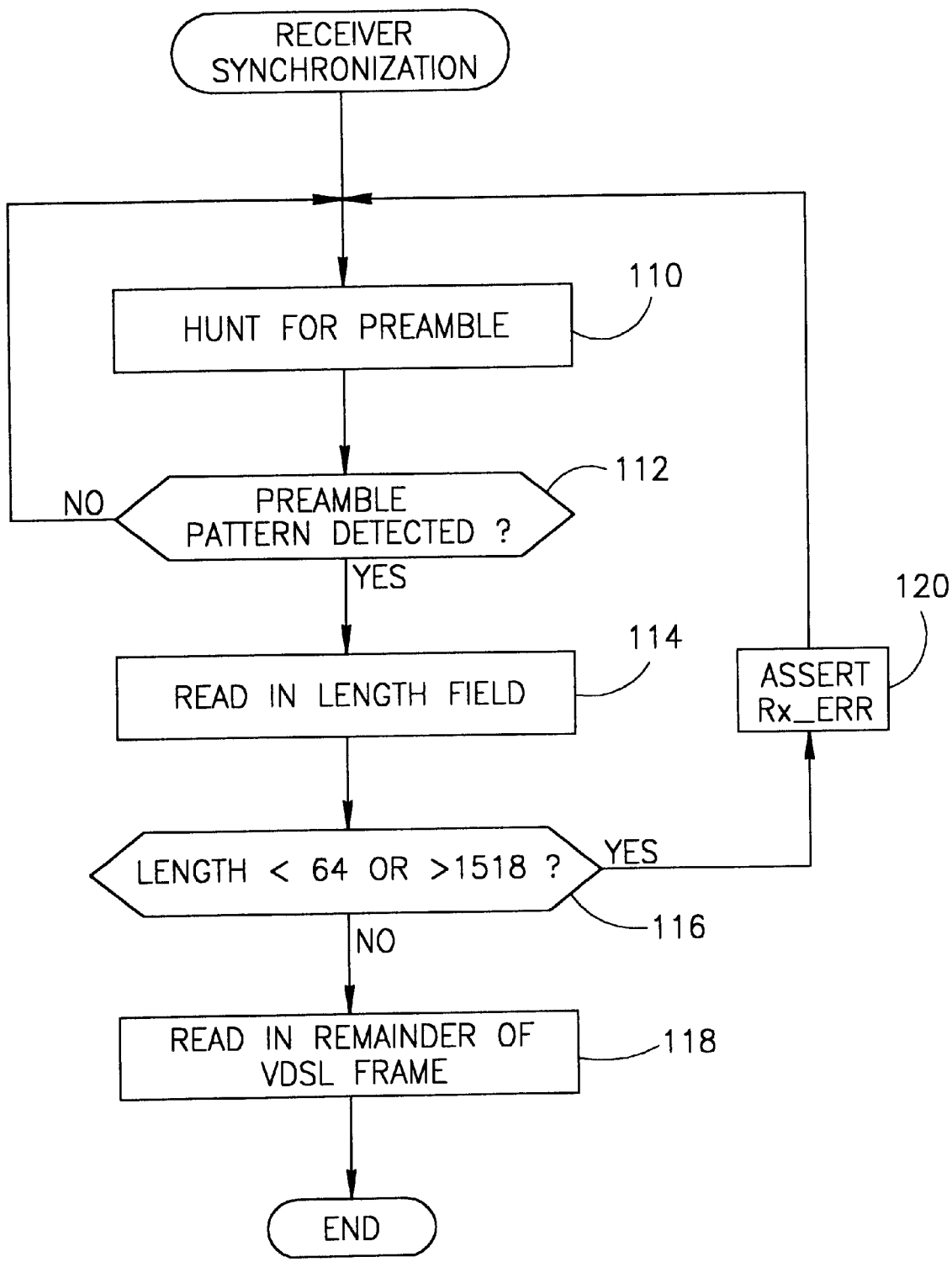
FIG. 8 is a flow diagram illustrating the receiver synchronization method of the present invention.

A flow diagram illustrating the receiver synchronization method of the present invention is shown in FIG. 8. The first step is to hunt for the preamble (step 110). If the preamble pattern is detected (step 112), the first two bytes following the preamble are read in (step 114). This is the length field. Since the VDSL frame payload only carries Ethernet data, the value of the length field must be in the range of 64 to 1518 bytes. If the value of the length is less than 64 or more than 1518 (step 116), then the preamble bit pattern detected was not a preamble indicating the start of a VDSL frame. The Rx Err signal is asserted by the VDSL transceiver (step 120) and a search of the preamble starts anew (step 110). If the length is legal, the remainder of the VDSL frame is read in (step 118).

Using this sync method further decreases the probability of obtaining the wrong sync by a factor given below.

$$Pr(length\ error) = (1518 - 64) \cdot \left(\frac{1}{2}\right)^{16} \quad (2)$$

$$\approx 0.022$$

Multiplying this Pr(length error) factor by the Pr(preamble error) yields an overall probability for wrong synchronization given by Equation 3 below.

$$Pr(wrong\ sync) = Pr(preamble\ error) \cdot Pr(length\ error) \quad (3)$$

$$= \left(\frac{1}{2}\right)^{40} \cdot 0.022$$

$$\approx 2.2 \times 10^{-14}$$

This results in a relatively low probability of wrong synchronization. Even in the event a non preamble is detected due to the bit pattern occurring in the payload of the VDSL frame, the upper layers of the protocol stack, i.e., the transport layer, will detect an error and cause a retransmission or other error recovery scheme.

While the invention has been described with respect to a limited number of embodiments, it will be appreciated that many variations, modifications and other applications of the invention may be made.

What is claimed is:

1. A method of transporting Ethernet frames over a Very high speed Digital Subscriber Line (VDSL) transport facility, said method comprising the steps of:
   receiving an input Ethernet frame data from an Ethernet compatible communication device;
   encapsulating said received Ethernet frame within a VDSL frame;
   inserting a preamble and length field in said VDSL frame;
   transmitting said VDSL frame over said VDSL transport facility asynchronously with respect to a transmit Start of Cell (SOC) signal;
   receiving VDSL frame data from said VDSL transport facility asynchronously with respect to a receive SOC signal;
   extracting said Ethernet frame from said received VDSL frame and generating an output Ethernet frame therefrom; and
   transmitting said output Ethernet frame to said Ethernet compatible communication device.

2. The method according to claim 1, wherein said step of encapsulating comprises the step of stripping off the preamble and start of frame fields from said Ethernet frame before placing said Ethernet frame in said VDSL frame.

3. The method according to claim 1, wherein said length field inserted in said VDSL frame represents the length of said Ethernet frame without the Ethernet preamble and Ethernet start of frame fields.

4. The method according to claim 1, wherein said step of generating comprises the step of adding Ethernet preamble and Ethernet start of frame fields to said extracted Ethernet frame.

5. A method of transporting Ethernet frames over a Very high speed Digital Subscriber Line (VDSL) transport facility, said method comprising the steps of:
   receiving an input Ethernet frame data from an Ethernet compatible communication device;
   generating a multibyte preamble field for use in identifying the start of a VDSL frame by a receiver;
   generating a length field representing the length of said Ethernet frame to be transmitted over said VDSL transport;
   generating a data field comprising said Ethernet frame to be transmitted over said VDSL transport facility;
   assembling said preamble field, length field and said data field so as to generate a VDSL frame;
   transmitting said VDSL frame over said VDSL transport facility asynchronously with respect to a transmit Start of Cell (SOC) signal;
   receiving VDSL frame data over said VDSL transport facility asynchronously with respect to a receive SOC signal;

extracting the Ethernet frame from said data field and generating an output Ethernet frame therefrom; and transmitting said output Ethernet frame to said Ethernet compatible communication device.

6. The method according to claim 5, wherein said step of encapsulating comprises the step of stripping off the preamble and start of frame fields from said Ethernet frame before placing said Ethernet frame in said VDSL frame.

7. The method according to claim 5, wherein said length field inserted in said VDSL frame represents the length of said Ethernet frame without the Ethernet preamble and Ethernet start of frame fields.

8. The method according to claim 5, wherein said step of generating comprises the step of adding Ethernet preamble and Ethernet start of frame fields to said extracted Ethernet frame.

9. The method according to claim 1, wherein upon detection of said preamble, a receiver checking if said preamble is a real preamble or Ethernet data within a payload of said VDSL frame.

10. The method according to claim 1, wherein upon detection of said preamble, a receiver checking if said preamble is a real preamble or Ethernet data within a payload of said VDSL frame, and if said preamble is actually a preamble, continuing to read in said VDSL frame.

11. The method according to claim 1, wherein upon detection of said preamble, a receiver checking if said preamble is a real preamble or Ethernet data within a payload of said VDSL frame, and if said preamble not actually a preamble, declaring an error and continuing to hunt for a preamble.

12. A method of transporting Ethernet frames over a Very high speed Digital Subscriber Line (VDSL) transport facility, said method comprising the steps of:

receiving Ethernet frames for transmission over said VDSL transport facility;

encapsulating said received Ethernet frames within VDSL frames, wherein said Ethernet frames are placed within DVSL frames without any segmentation prior to encapsulation;

inserting a preamble and length field into said VDSL frames; and transmitting VDSL frames over said VDSL transport facility asynchronously with respect to a transmit Start of Cell (SOC) signal.

13. The method according to claim 12, wherein said preamble is chosen to have optimal autocorrelation properties.

14. The method according to claim 12, wherein said transport facility comprises a 10BaseS transport facility.

15. The method according to claim 12, wherein said preamble is adapted to enable a receiver to determine the beginning of a VDSL frame.

16. The method according to claim 12, wherein said length field is adapted to enable a receiver to determine the end of a VDSL frame.

17. An apparatus for transporting Ethernet frames over a Very high speed Digital Subscriber Line (VDSL) transport facility, comprising:

an Ethernet transceiver for transmitting and receiving Ethernet frames to and from an Ethernet port;

a VDSL transceiver for transmitting and receiving VDSL frames to and from said VDSL transport facility;

means for encapsulating Ethernet frames within VDSL frames, wherein said Ethernet frames are placed within DVSL frames without any segmentation prior to encapsulation;

means for extracting Ethernet frames from VDSL frames received over said VDSL transport facility;

means for inserting a preamble and length field into said VDSL frames; and wherein VDSL frames are transmitted and received over said VDSL transport facility asynchronously with respect to transmit and receive Start of Cell (SOC) signals, respectively.

18. The apparatus according to claim 17, wherein said apparatus in incorporated within an Ethernet to VDSL Customer Premises Equipment (CPE).

19. The apparatus according to claim 17, further comprising means for synchronizing reception of VDSL frames utilizing said preamble.

20. The apparatus according to claim 17, further comprising means for determining the beginning of a VDSL frame utilizing said preamble.

21. The apparatus according to claim 17, further comprising means for determining the end of end of a VDSL frame utilizing the length field received in a VDSL frame.

22. The apparatus according to claim 17, further comprising means for determining whether a detected start of frame is valid whereby the length field of a received VDSL frame is examined for a legal length value.

23. A Digital Subscriber Line Access Multiplexer (DSLAM) for transporting Ethernet frames over a Very high speed Digital Subscriber Line (VDSL) transport facility, comprising:

a plurality of VDSL transceivers for transmitting and receiving VDSL frames to and from said VDSL transport facility;

encapsulation means for encapsulating Ethernet frames within VDSL frames, wherein said Ethernet frames are placed within DVSL frames without any segmentation prior to encapsulation;

means for inserting a preamble and length field into said VDSL frames;

extracting means for extracting Ethernet frames from VDSL frames received over said VDSL transport facility;

an Ethernet transceiver for transmitting and receiving Ethernet frames to and from an Ethernet port; and wherein VDSL frames are transmitted and received over said VDSL transport facility asynchronously with respect to transmit and receive Start of Cell (SOC) signals, respectively.

24. The DSLAM according to claim 23, further comprising an Ethernet switch adapted to switch multiple Ethernet streams between said Ethernet transceiver and said encapsulation means and said extraction means.

25. The DSLAM according to claim 23, further comprising means for synchronizing reception of VDSL frames utilizing said preamble.

26. The DSLAM according to claim 23, further comprising means for determining the beginning of a VDSL frame utilizing said preamble.

27. The DSLAM according to claim 23, further comprising means for determining the end of end of a VDSL frame utilizing the length field received in a VDSL frame.

28. The DSLAM according to claim 23, further comprising means for determining whether a detected start of frame is valid whereby the length field of a received VDSL frame is examined for a legal length value.

29. An apparatus for transporting Ethernet frames over a Very high speed Digital Subscriber Line (VDSL) transport facility, comprising:

means for receiving Ethernet frames for transmission over said VDSL transport facility;

means for encapsulating said received Ethernet frames within VDSL frames, wherein said Ethernet frames are placed within DVSL frames without any segmentation prior to encapsulation;

means for inserting a preamble and length field into said VDSL frames; and means for transmitting VDSL frames over said VDSL transport facility asynchronously with respect to a transmit Start of Cell (SOC) signal.

30. The apparatus according to claim 29, further comprising means for determining whether a detected start of frame is valid whereby the length field of a received VDSL frame is examined for a legal length value.

* * * * *